(12) United States Patent
Koizumi et al.

(10) Patent No.: US 8,292,480 B2
(45) Date of Patent: Oct. 23, 2012

(54) LAMP INCLUDING MAIN REFLECTOR, SUB-REFLECTOR AND LED ASSEMBLY

(75) Inventors: Hiroya Koizumi, Shizuoka (JP); Miki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 350 days.

(21) Appl. No.: 12/496,086

(22) Filed: Jul. 1, 2009

(65) Prior Publication Data

US 2010/0008088 A1    Jan. 14, 2010

(30) Foreign Application Priority Data

Jul. 10, 2008  (JP) ................................. 2008-179996
Jul. 10, 2008  (JP) ................................. 2008-179997

(51) Int. Cl.
*F21S 8/10*  (2006.01)

(52) U.S. Cl. ........ 362/545; 362/541; 362/544; 362/509; 362/511; 362/519

(58) Field of Classification Search .................. 362/543, 362/544, 545, 487, 498, 499
See application file for complete search history.

(56) References Cited

U.S. PATENT DOCUMENTS

| | | | | |
|---|---|---|---|---|
| 4,949,226 A | * | 8/1990 | Makita et al. ................. | 362/538 |
| 5,278,731 A | | 1/1994 | Davenport et al. | |
| 5,582,480 A | * | 12/1996 | Zwick et al. .................. | 362/298 |
| 6,652,129 B2 | * | 11/2003 | Aoki ............................. | 362/600 |
| 6,896,397 B2 | * | 5/2005 | Yamada et al. ................ | 362/511 |
| 6,976,769 B2 | * | 12/2005 | McCullough et al. ........ | 362/345 |
| 7,036,967 B2 | * | 5/2006 | Morishita et al. ............. | 362/517 |
| 7,249,877 B2 | * | 7/2007 | Johnson et al. ................ | 362/545 |
| 7,278,768 B2 | * | 10/2007 | Gasquet ........................ | 362/539 |
| 2003/0035299 A1 | | 2/2003 | Amano | |
| 2004/0120160 A1 | * | 6/2004 | Natsume ....................... | 362/544 |
| 2005/0162854 A1 | | 7/2005 | Finch | |

(Continued)

FOREIGN PATENT DOCUMENTS

DE            200 13 330 U1    1/2001

(Continued)

OTHER PUBLICATIONS

Communication from the State Intellectual Property Office of P.R. China dated May 4, 2011 in a counterpart application No. 200910140054.7.

(Continued)

*Primary Examiner* — Robert May
*Assistant Examiner* — Bryon T Gyllstrom
(74) *Attorney, Agent, or Firm* — Sughrue Mion, PLLC

(57) ABSTRACT

A lamp is provided. The lamp includes a lamp housing; light emitting diodes (LEDs); a main reflector disposed so as to oppose to the LEDs for reflecting light emitted from the LEDs towards a front side of the lamp; a sub-reflector which is interposed between the LEDs and the main reflector, and which reflects and diffuses the light emitted from the LEDs towards the main reflector; an LED element assembly which extends in parallel with the sub-reflector and comprises a plurality of flat portions, each flat portion corresponding to one of the plurality of LEDs and on which the corresponding LED is mounted, adjacent ones of the flat portions being coupled together by at least one step portion; and a center portion which covers the LED element assembly and the LEDs such that the LEDs are not exposed to the front side of the lamp.

13 Claims, 10 Drawing Sheets

U.S. PATENT DOCUMENTS

2007/0121331 A1    5/2007   Chinniah et al.

FOREIGN PATENT DOCUMENTS

| | | |
|---|---|---|
| DE | 201 02 587 U1 | 5/2001 |
| DE | 101 01 795 A1 | 7/2002 |
| DE | 101 53 543 A1 | 5/2003 |
| DE | 103 29 185 A1 | 1/2005 |
| DE | 10 2005 005860 A1 | 8/2005 |
| EP | 1 022 187 A2 | 7/2000 |
| EP | 1 835 224 A1 | 9/2007 |
| JP | 2000-251508 A | 9/2000 |
| JP | 2001-297609 A | 10/2001 |
| JP | 2003-59313 A | 2/2003 |
| WO | 2008/032277 A2 | 3/2008 |

OTHER PUBLICATIONS

Extended European Search Report issued Oct. 13, 2010 in corresponding European application No. 09008985.5.

Extended European Search Report issued Jul. 12, 2010 in corresponding European application No. 09008985.5.

* cited by examiner

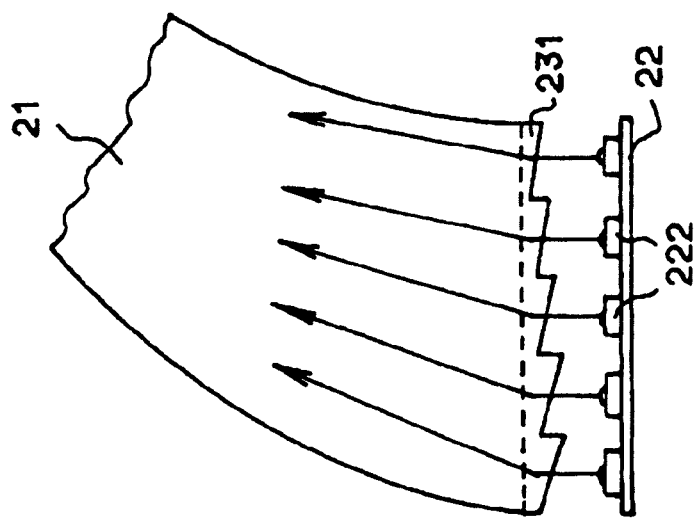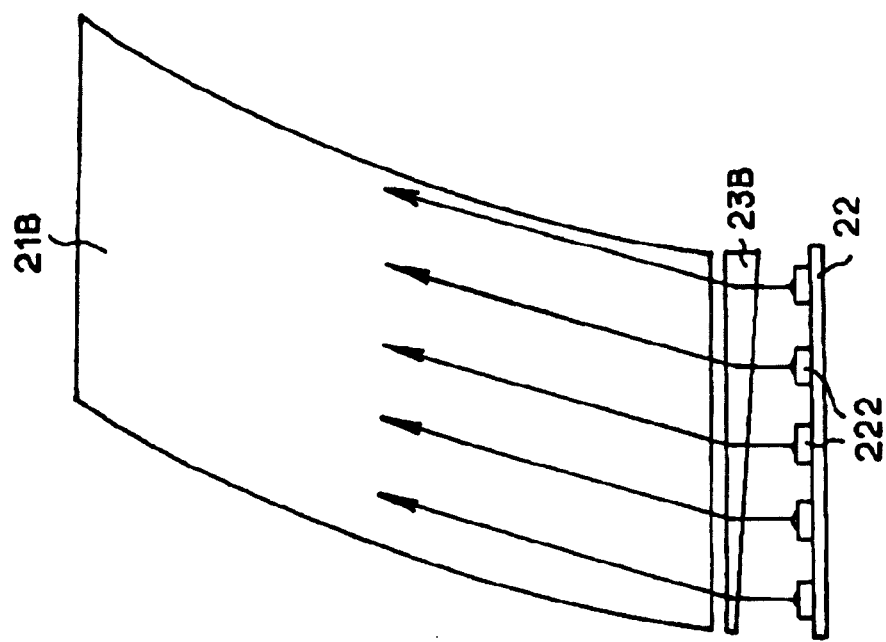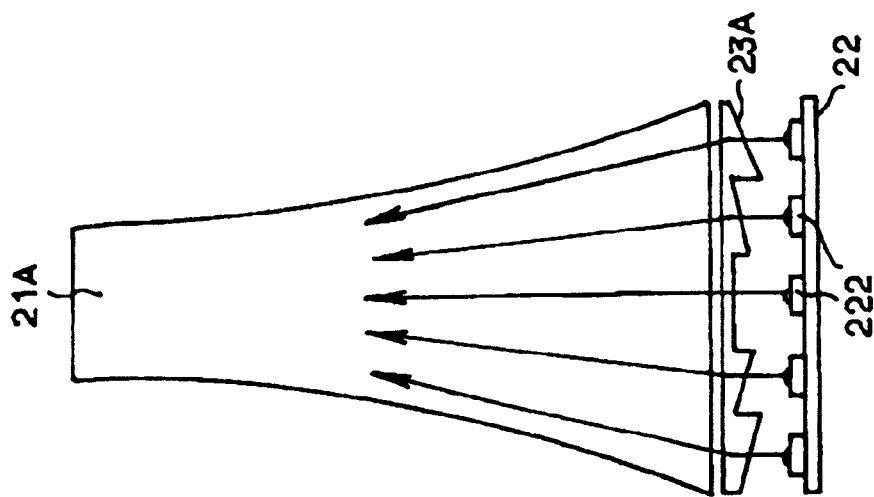

LAMP INCLUDING MAIN REFLECTOR, SUB-REFLECTOR AND LED ASSEMBLY

BACKGROUND OF THE INVENTION

1. Field of the Invention

Apparatuses and devices consistent with the present invention relate to lamps and, more particularly, to lamps that use light emitting diodes (LEDs) as a light source and/or use light guide plates.

2. Description of Related Art

Lamps employing LED elements as a light source have been proposed as lamps for vehicles in recent years. When compared with incandescent lamps, the LED element is advantageous in reducing the consumed power. However, since the output angle at which light is outputted from the LED element is small, when LED elements are used for a vehicle lamp, the LED elements need to be arranged so as to increase the light emitting area of the lamp.

For example, a related art lamp described in Japanese Patent Unexamined Publication JP-A-2001-297609 includes a substantially circular reflector which has first and second reflecting surfaces for reflecting sequentially light emitted from LED elements. In this lamp, the light reflected on the first reflecting surface advances in a radial direction which is perpendicular to an optical axis, and the light so reflected is reflected by the second reflecting surface towards an opposite direction of the emitting optical axis, and then, the light is projected to a front side of the lamp. In this way, the light from the LED elements is made reflected in the radial direction by the first reflecting surface, the area where light is reflected from the second reflecting surface is increased, and light emitting area of the lamp as a whole is increased.

Further, in a related art lamp described in Japanese Patent Unexamined Publication JP-A-2003-59313, a reflector having a reflecting surface which is approximately a flat plane is arranged so as to face to a front side of the lamp while being tilted slightly downwards, and LED elements are arranged in a position lying directly underneath the reflecting surface. In this lamp, the light emitted from the LED elements is made into a parallel beam by a Fresnel lens, and the parallel beam is projected onto the reflecting surface of the reflector, and the light reflected by the reflector is projected towards the front of the lamp. In this configuration, since light emitted from the LED elements can be projected onto almost the whole surface area of the reflecting surface, the lamp can be configured to have a wide light emitting area which corresponds to the area of the reflecting surface.

In this way, the related art lamps of JP-A-2001-297609 and JP-A-2003-59313 are advantageous in increasing the light illuminating area, compared with a case where light emitted from the LED elements is simply outputted from the lamp.

However, in the related art lamp described in JP-A-2001-297609, since the first reflecting surface is made in a substantially circular conical shape so that light from the LEDs is reflected in the radial direction in the form of the parallel beam, a light distribution pattern of the lamp to be formed becomes a substantially circular light distribution pattern. Thus, there is a disadvantage in that it becomes difficult to make an area close to the center function as a light emitting surface. In view of this disadvantage, in JP-A-2001-297609, separated LED elements or first and second reflecting surfaces for illuminating the central area are required, and accordingly, the resulting construction is complex. In addition, in the related art lamp described in JP-A-2001-297609, since the light emitting surface of the lamp is limited to the area where the second reflecting surface resides, that is, a plane (a two-dimensional plane) which is orthogonal to the optical axis where the light reflected on the first reflecting area resides, there is a is advantage in that it becomes difficult to apply the technique described in the JP-A-2001-297609 to, for example, an automotive lamp in which a horizontal light distribution range is made wider than a vertical light distribution range and in which the light emitting surface is curved vertically and horizontally into a three-dimensional plane.

On the other hand, in the related art lamp described in the JP-A-2003-59313, although the light emitted from the LED elements is formed into the parallel beam by the Fresnel lens, since the reflecting surface which is tilted relative to the parallel beam is made into the light emitting surface, the difference in optical path length between the portions near and far from the LED elements directly creates a difference in brightness over the reflecting surface. Therefore, there is a disadvantage in that it becomes difficult to obtain a uniform brightness on the light emitting surface. In addition, since the reflector has a reflecting surface that is approximately flat, the light emitting surface of the lamp is limited to a surface which is close to the two-dimensional surface, and therefore, as has been described before, there is a disadvantage in that the lamp described in JP-A-2003-59313 becomes difficult to be applied in a case where the light emitting surface is curved in a three-dimensional fashion.

Additionally, related art lamps which have a light guide plate as a light emitting unit disposed within a lamp housing of the lamp have been proposed. This light guide plate is plate-like shape and is made of transparent resin in which the light is introduced therein so as to be totally reflected on an internal surface thereof. The guide plate is disposed so that a surface having large square faces forward of the lamp as a light emission surface and a plurality of minute reflecting elements are provided on a rear surface of the light emission surface. The minute reflecting elements have conical or pyramidal minute recesses which are referred to as stipple. In addition, an end face of the light guide plate which lies orthogonal to the light emission surface is made into a light introduction surface, and a light source of LED elements or the like is arranged so as to be opposed to the light introduction surface. When light emitted from the LED elements is guided into the interior of the light guide plate through the light introduction surface, the light so guided is reflected by the minute reflecting elements so as to be emitted from the light emission surface. Such a related art lamp is described, for example, in Japanese Patent Unexamined Publication JP-A-2000-251508.

In the light emission unit described in JP-A-2000-251508, since a light guide plate is formed into a flat rectangular plate shape, light from LED elements which is inputted from an end face of the light guide plate is guided while traveling straight in an interior of the light guide plate. Total reflecting cuts are provided on a rear surface of the light guide plate. Since the light which is guided in the interior of the light guide plate is reflected by these total reflecting cuts so as to be emitted from a front surface of the light guide plate, the front surface of the light guide plate is configured as a light emitting surface. In addition, in JP-A-2000-251508, since light from the LED elements is made to be incident on end faces of four sides of the rectangular light guide plate, light can be guided to almost the whole areas of the light guide plate, whereby light can be emitted from the whole surface with almost uniform brightness.

In the related art lamp including a light guide plate emission unit like the one described above, there is a disadvantage in that mounting the light emission unit of the light guide plate within the lamp housing is difficult (i.e., it is difficult to form the light guide plate in a flat plate shape). Moreover, there is an additional disadvantage in that the number of LED elements that may be used are restricted (i.e., it is difficult to introduce the light of LED element from a certain end face of the light guide plate as described in the JP-A-2000-251508). In such cases, the light has to be introduced into the light guide plate from only part of the end faces of the light guide plate, and as this occurs, guiding light over the whole surface areas of the light guide plate becomes difficult. Thus, it becomes difficult to illuminate all the surfaces of the light guide plate with uniform brightness.

In particular, since there are many cases in which a front cover which is disposed at a front side of a lamp is formed into a curved surface to follow a body configuration of a vehicle, when a light emitting unit of the light guide plate is mounted in an interior of such a lamp, a light guide plate needs to be curved in two-dimensions or three-dimensions in accordance with the curvature of the front cover. In addition, in the event that the light guide plate is desired to be a shape other than a rectangular shape, there is a disadvantage in that light from the LED elements has to be guided into the light guide plate only from one of the end faces of the light guide plate. As this occurs, light that has been guided into the interior of the light guide plate leaks to the outside of the light guide plate at a portion where the light guide plate is curved two-dimensionally or three-dimensionally because the inner surface of the light guide plate at the two-or three-dimensionally curved portion does not have total reflection of light thereon. Accordingly, the light cannot be guided to areas of the light guide plate which lie further ahead, and the quantity of light emitted from the light emitting surfaces of those areas is reduced. Thus, the light guide plate cannot be illuminated with uniform brightness over the whole surface area thereof. Because of this, an uniform lighting state cannot be obtained in the related art lamp with the light guide plate in such a state when the lamp is seen from the front thereof, and therefore, the illumination effect of the lamp is reduced.

SUMMARY OF THE INVENTION

It is an aspect of the invention to provide a lamp which can enlarge a light emitting area and make a light emitting surface into a three-dimensional plane.

It is another aspect of the invention to provide a lamp which is improved in illumination effect and external appearance by including a light emission unit of the light guide plate which enables a uniform light emission over the whole surface area of a light guide plate.

According to one or more aspects of the invention, there is provided a lamp including:
 a first light emission unit comprising:
 a first light source;
 a light guide plate comprising:
  a light introduction surface provided so as to oppose to the first light source; and
  a curved light emission surface which emits light from the first light source that has passed through the light introduction surface; and
 an optical step which is provided on the light introduction surface and which refracts the light from the first light source in a direction in which the light emission surface is curved.

According to one or more aspects of the present invention, there is also provided a lamp including:
 a lamp housing;
 a plurality of light emitting diodes (LEDs) provided within the lamp housing;
 a main reflector disposed so as to oppose to the LEDs for reflecting light emitted from the LEDs towards a front side of the lamp;
 a sub-reflector which is interposed between the LEDs and the main reflector, and which reflects and diffuses the light emitted from the LEDs towards the main reflector;
 an LED element assembly which extends in parallel with the sub-reflector and comprises a plurality of flat portions, each flat portion corresponding to one of the plurality of LEDs and on which the corresponding LED is mounted, adjacent ones of the flat portions being coupled together by at least one step portion; and
 a center portion which covers the LED element assembly and the LEDs such that the LEDs are not exposed to the front side of the lamp.

BRIEF DESCRIPTION OF THE DRAWINGS

FIG. 9A is a front view of reflector emission units according to a third exemplary embodiment of the present invention;

FIG. 9B is a front view of reflector emission units according to a fourth exemplary embodiment of the present invention;

FIG. 9C is a front view of reflector emission units according to a fifth exemplary embodiment of the present invention.

DETAILED DESCRIPTION OF EXEMPLARY EMBODIMENTS OF THE PRESENT INVENTION

[First Exemplary Embodiment]

Figure 1:
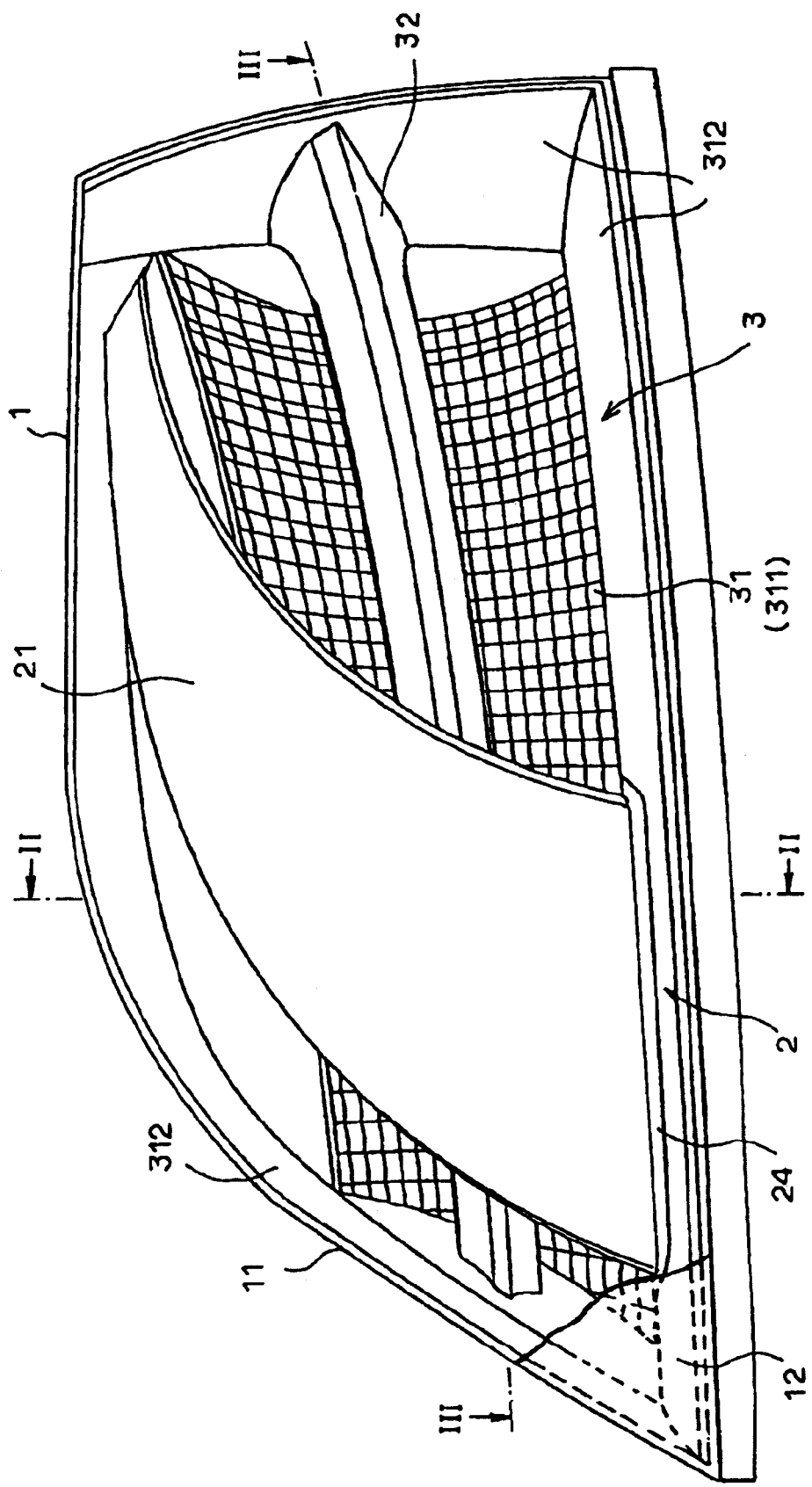
FIG. 1 is a front view of a lamp according to a first exemplary embodiment of the present invention.
Figure 2:
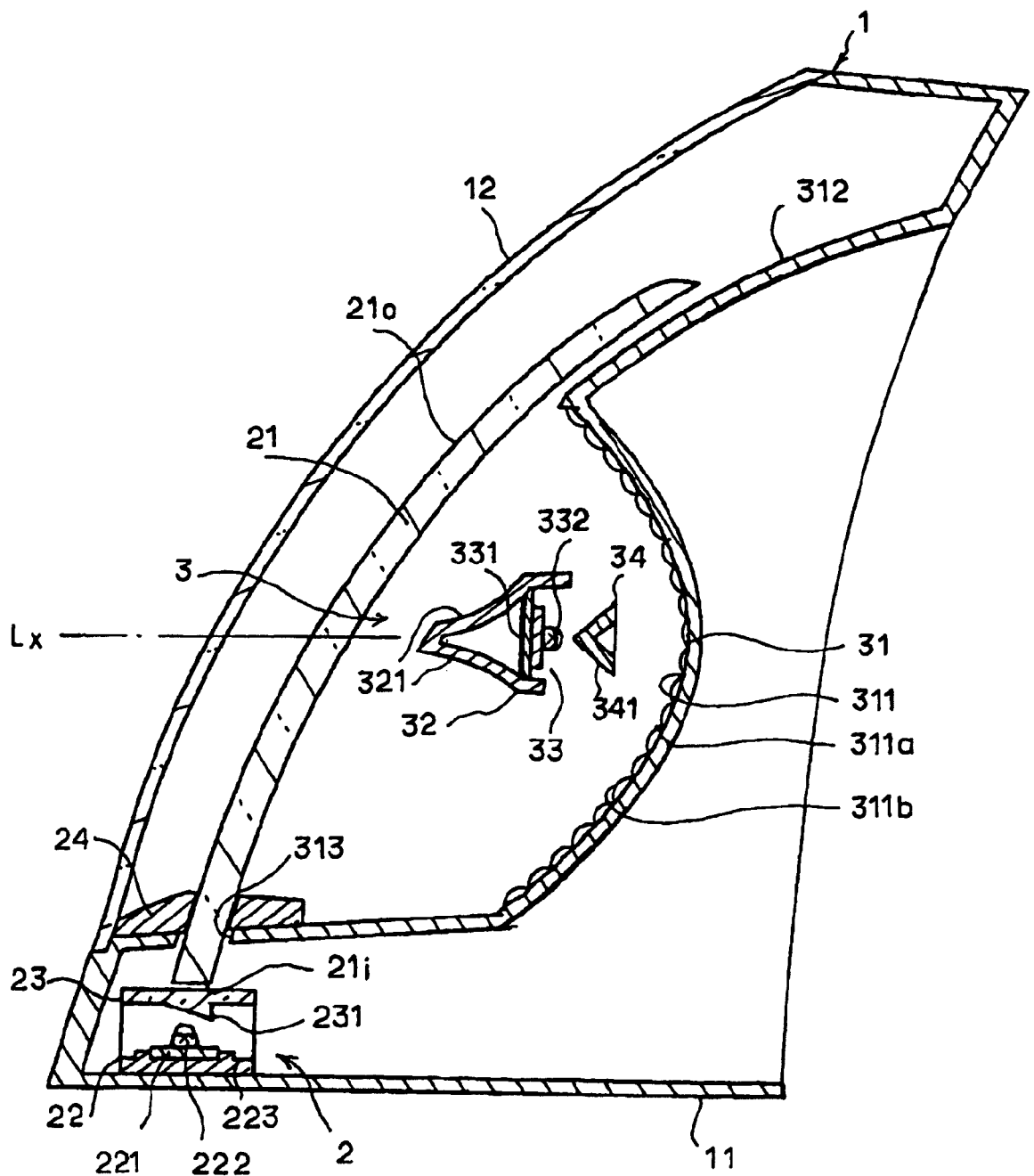
FIG. 2 is a vertical sectional view taken along the line II-II in FIG. 1.
Figure 3:
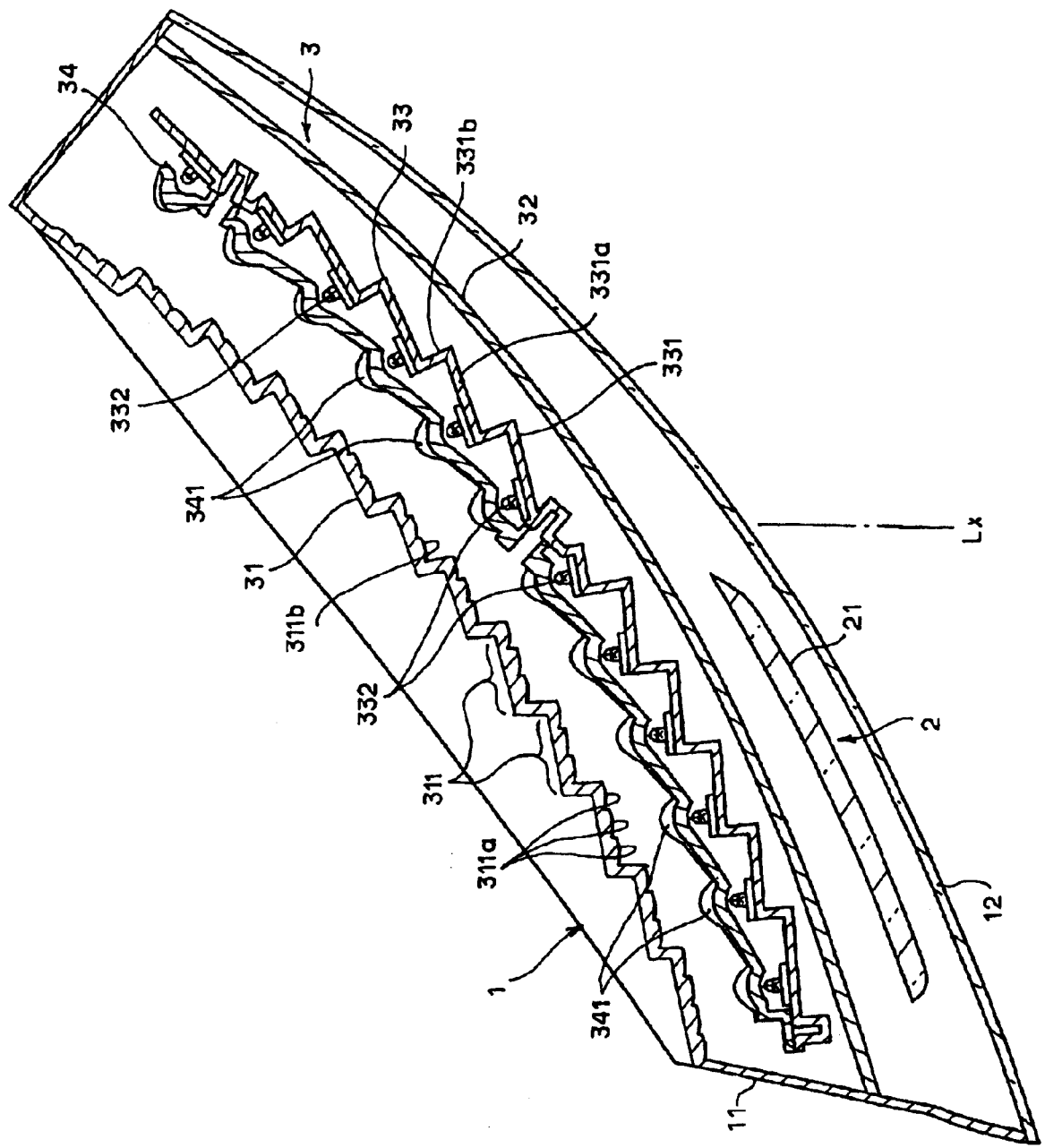
FIG. 3 is a horizontal sectional view taken along the line III-III in FIG. 1.

Next, a first exemplary embodiment of the invention will be described. In FIGS. 1 through 3, a lamp housing 1 includes a lamp body 11 which can be mounted on a right-hand side of a rear part of a vehicle body and which has a vessel-like shape which is made to open in a front surface (a front side) thereof. The lamp housing 1 also includes a transparent front cover 12 which is attached to the front opening. The front cover 12 has a curved shape which projects to the front or in a left-right direction so as to follow the rounded shape of the vehicle body so as to configure part of the vehicle body shape of the vehicle. The lamp of the first exemplary embodiment is configured as a multi-function lamp having a tail lamp function and a stop lamp function. Accordingly, integrally incorporated within the lamp housing 1 are a light guide plate emission unit 2 (a first light emitting unit) which is made into a tail lamp which is lit while the vehicle is driven during night time and a reflector emission unit 3 (a second light emitting unit) which is made into a stop lamp which is lit when the brakes are applied. In addition, although the illustration and description of a left-hand lamp are omitted here, since the left-hand lamp is transversely symmetrical with the right-hand lamp, in the following description, "right" is to be read as "left" for description of the left-hand lamp.

Figure 4:
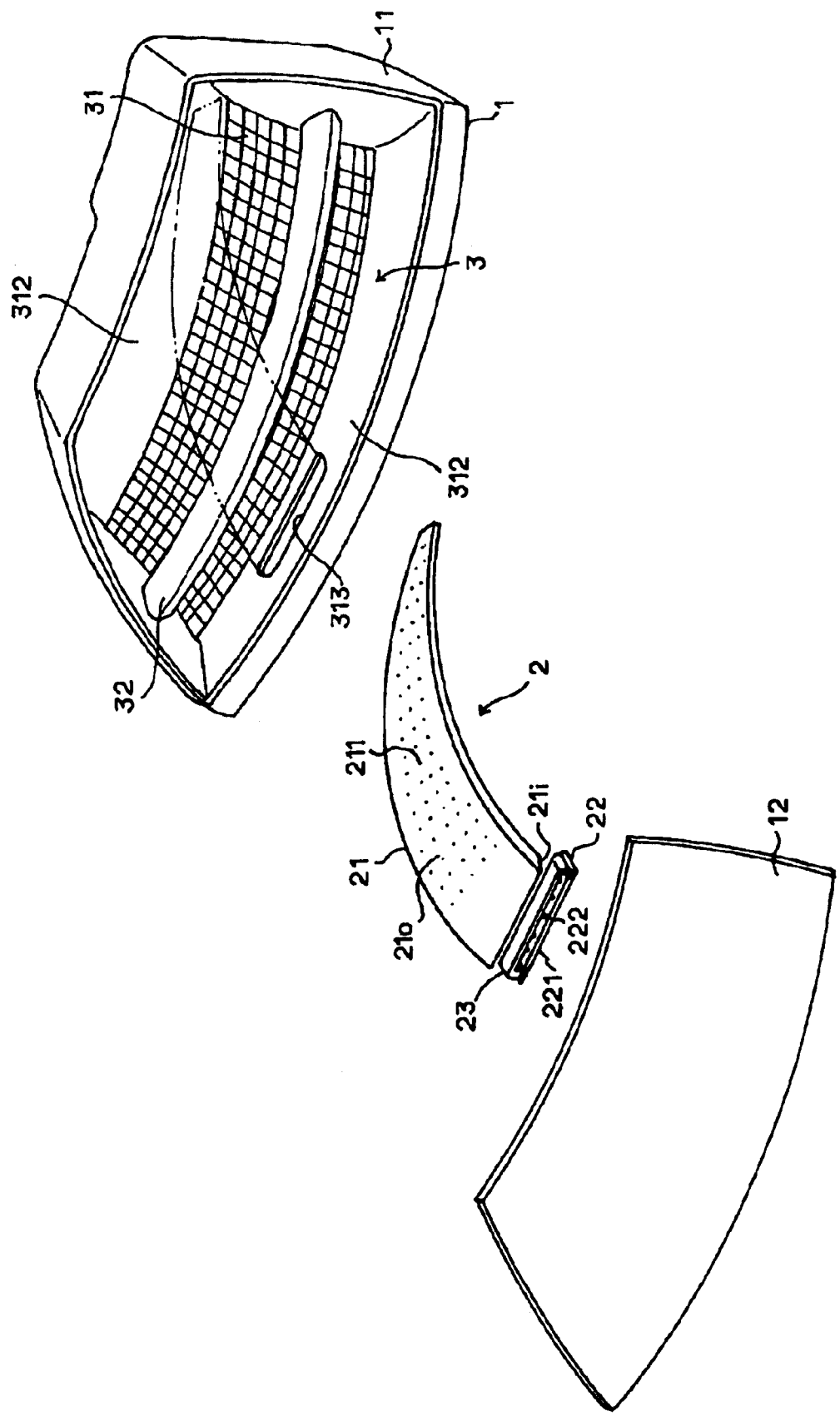
FIG. 4 is an exploded perspective view showing a schematic configuration of the lamp of FIG. 1.

FIG. 4 is a partial exploded perspective view of part of the lamp of the first exemplary embodiment which illustrates schematic configurations of the light guide plate emission unit 2 and the reflector emission unit 3. The light guide plate emission unit 2 comprises a plate-like light guide plate 21 and an LED element assembly. The light guide plate 21 has a width dimension that is gradually reduced as the light guide plate 21 extends from a left lower area to a right upper area within the lamp housing 1 as viewed from the front of the lamp (i.e., from the rear of the vehicle) and which is curved so as to warp gradually to the rear as viewed in a thickness direction. The LED element assembly 22 (a first light source) includes a plurality of LED elements which are arranged on a lower side of a lower end face of the light guide plate 21 so as to confront the lower end face of the light guide plate 21. In addition, in the same figure, the reflector emission unit 3 includes a main reflector 31 which is disposed behind the light guide plate emission unit 2 and is made to extend over an area almost equal to the whole surface of the front cover 12 and a stem-shaped center portion 32 which is provided to stretch horizontally in a position lying on a front side of the main reflector 31. Although not shown in FIG. 4, but as will be described later, the center portion 32 includes inside thereof an LED element assembly (a second light source) comprising a plurality of LED elements 332 which are arranged in a length direction of the center portion 32 and a sub-reflector 34 which is arranged so as to be opposed to the LED element assembly 33 (see, e.g., FIG. 7).

Figure 5:
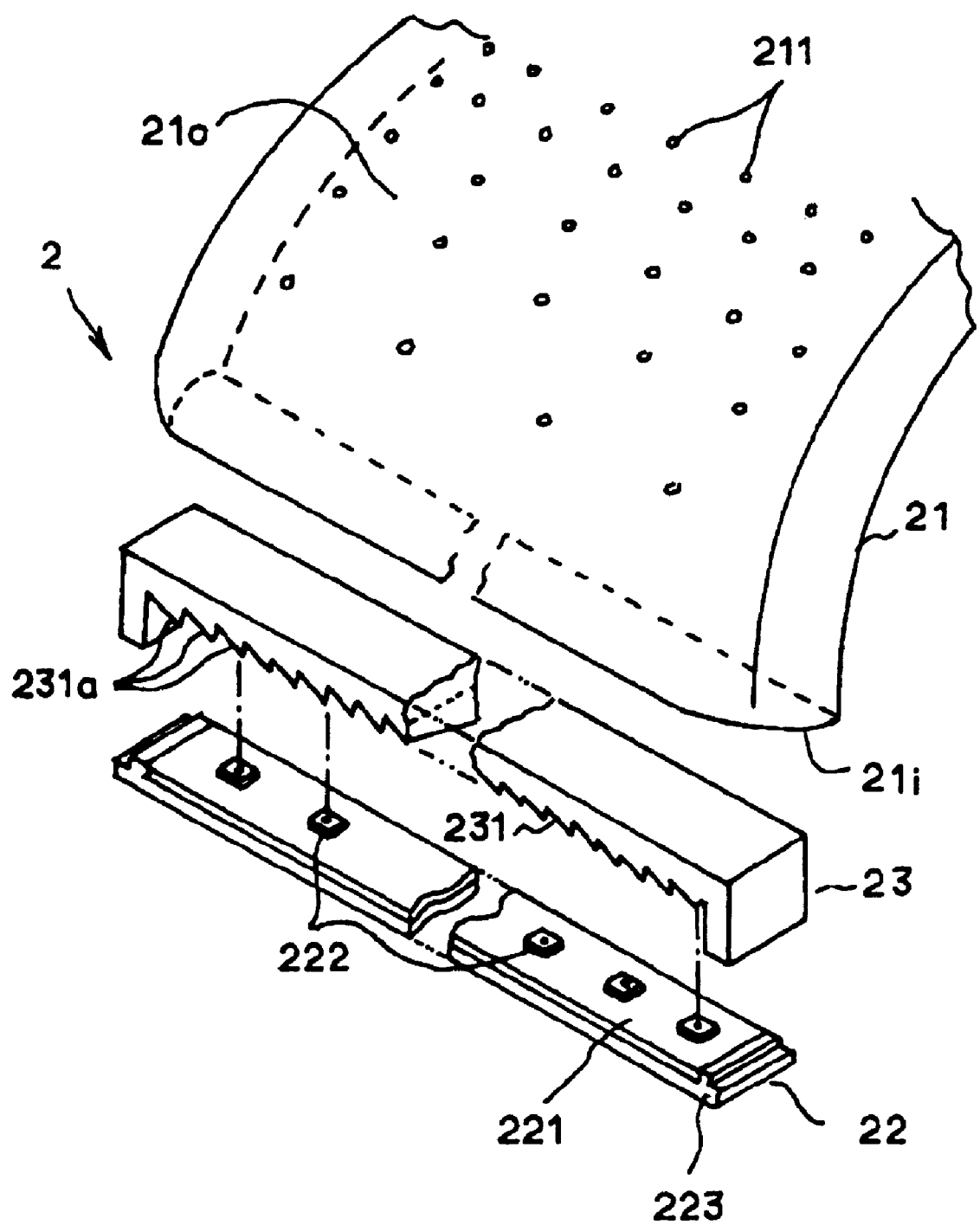
FIG. 5 is an enlarged perspective view of a light guide plate emission unit of the lamp of FIG. 1.
Figure 6B:
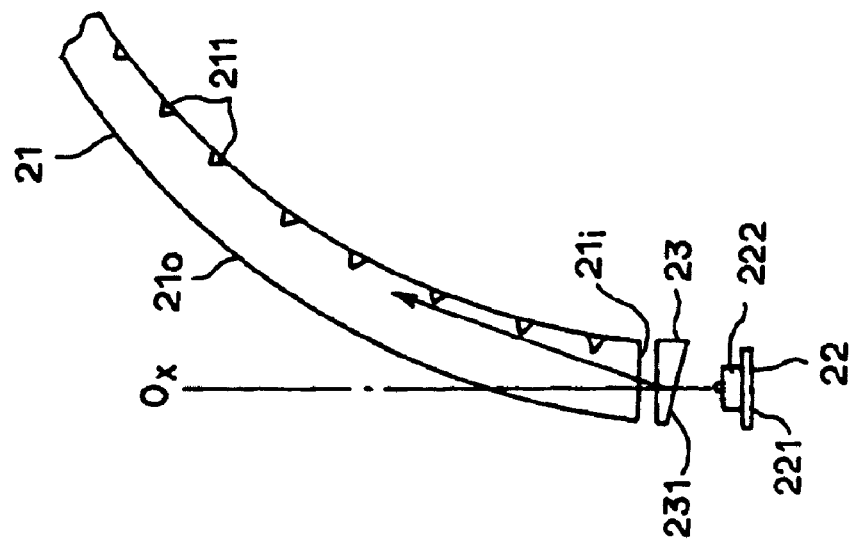
FIGS. 6A and 6B are a front view and a side view, respectively, of the light guide plate emission unit of FIG. 5.
Figure 6A:
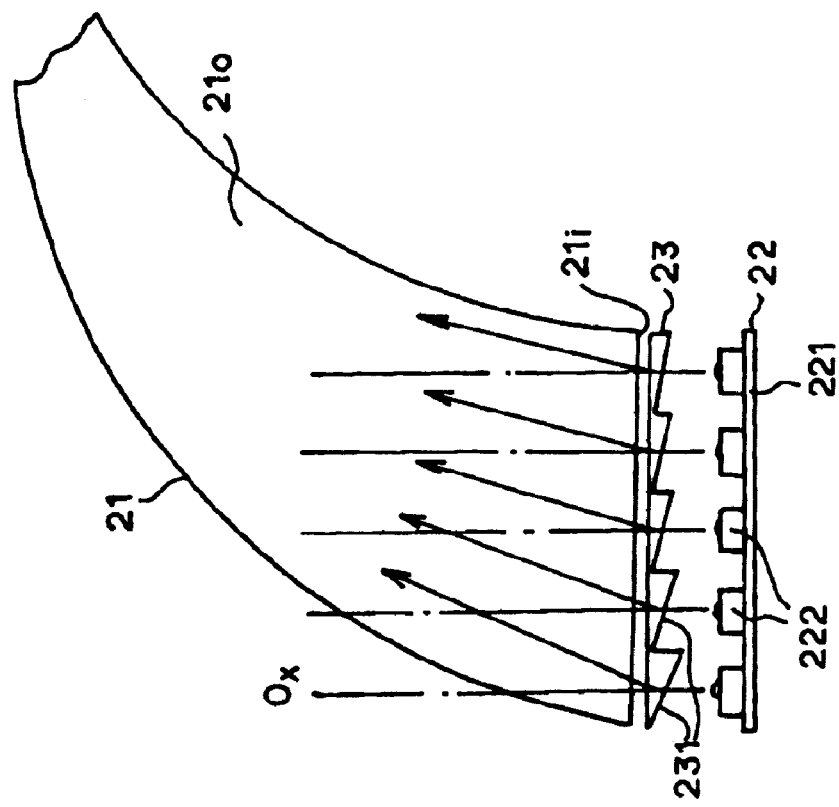

FIG. 5 is an enlarged perspective view of part of the light guide plate emission unit 2 and FIGS. 6A and 6B are a front view and a side view, respectively, which show a conceptual configuration of the light emitting light guide plate 2.

The light guide plate 21 is such that a transparent material which transmits light is worked into a substantially uniform thickness and is formed into the curved shape which is moderately curved to the right while the width dimension thereof is gradually reduced as the light guide plate 21 extends from the left lower area to the right upper area when viewed from the front. Moreover, when viewed in the thickness direction, the light guide plate 21 is formed in a curved shape which warps towards the rear of the lamp with a moderate curvature along a curved inner surface of the front cover. A front surface of the light guide plate 21 is made into a light emission surface 21o which emits light, and the light emission surface 21o is made into a shape which is curved in a third-dimensional direction due to the curved construction of the light guide plate 21 described above.

A large number of minute reflecting elements 211 are provided on a back side of the light guide plate 21 for reflecting light that is guided through the light guide plate 21. The minute reflecting elements 211 comprise conical or pyramidal minute recesses, that is, so-called stipples, which are arranged over almost the whole area of the back side of the light guide plate 21. In addition, an end face of the left lower area of the light guide plate 21 is configured as a light introduction surface 21i. An elongated stepped plate 23 which is made of a material which transmits light is disposed near the light introduction surface 21i, and a plurality of LED elements 222 are arranged along the stepped plate on a lower side of the stepped plate 23, so as to confront the light introduction surface 21i via the stepped plate 23. In this exemplary embodiment, the LED elements 222 are red. The LED elements 222 are mounted in a row at intervals on an elongated circuit board 221. Further, the LED elements 222 are supported on a supporting base plate 223 and are then formed into the LED element assembly 22. Although the LED elements 222 may be provided either in the form of a chip or as discrete LED elements, an optical axis Ox of light emitted from each LED element 222 is oriented in a vertical direction. Namely, the light output axis of the LED elements 222 is oriented vertically relative to the light introduction surface 21i.

The stepped plate 23 is formed of a transparent resin into an elongated plate piece-like shape and is supported integrally on the supporting base plate 223 of the LED element assembly 22 at both longitudinal ends thereof. A lower surface of the stepped plate 23 is made into optical steps 231 for refracting light from the individual LED elements 222 such that the input direction of the light is changed when the light is inputted to the light introduction surface 21i. Here, the optical steps 231 are formed so as to be divided so as to correspond individually to the respective LED elements 222 and are made up of wedge-shaped steps of which input surfaces are inclined at different angles relative to the optical axes Ox of light which is outputted from the individual LED elements 222. In addition, in the first exemplary embodiment, in order to reduce the thickness of the stepped plate 23, each optical step 231 is formed as a Fresnel lens. Accordingly, a plurality of wedge-shaped steps 231a are provided for each LED element 222. For example, in this exemplary embodiment, there are three wedge-shaped steps 231a for every one LED element 222. By this configuration, the stepped plate 23 is formed into a serrated configuration in which a plurality of wedge-shaped steps 231a which are inclined identically or differently are arranged.

Namely, in each optical step 231, the light introduction surface is oriented at an angle at which light emitted from the corresponding LED element is, as will be described later, oriented in the three-dimensionally curved direction of the light guide plate when the light is refracted by the optical step 231, for example, at an angle at which light is oriented, as is shown in FIG. 6A, towards the right upper area of the light guide plate 21 when viewed from the front. Here, the step plate 23 is formed into the serrated configuration in which respective inclination angles of the optical steps 231 are increased in a stepped fashion from the right to the left so that a refraction angle, at which light emitted from an LED element lying further leftwards when viewed from the front is refracted to the right, is larger than a refraction angle at which light emitted from the LED element which lies further rightwards is refracted to the right. Note that FIG. 6A is a conceptual diagram showing a configuration in which a single optical step 231 is aligned with each LED element 222 which is so drawn for the sake of easy description of the refraction angles. In reality, however, as is shown in FIG. 5, each optical step 231 is made up of the Fresnel lens having a plurality of wedge-shaped steps 231a for each one of the LED elements 222.

In addition, the light guide plate 21 is curved in the thickness direction, and a sectional shape in the thickness direction of each optical step 231 has, as is shown in FIG. 6B, a lean-to sectional shape in which the light introduction surface is inclined towards the front side so that light emitted from each LED element 222 is directed upwards towards the rear along the curvature of the light guide plate 21 in the thickness direction. Here, the inclination angles of the light introduction surfaces which are oriented to the front are almost the same for each of the optical steps 231.

In the light guide plate emission unit 2, although light emitted from the individual LED elements 222 is directed vertically upwards so as to be inputted to the stepped plate 23, light inputted to the respective optical steps of the stepped plate 23 is refracted by the individual optical steps 231 so as to be inputted into the interior of the light guide plate 21 from the light introduction surface 21*i* of the light guide plate 21, the light so inputted being then guided upwards in the interior of the light guide plate 21. Since the optical steps 231 are formed into the serrated configuration when viewed from the front and into the lean-to configuration when viewed from the side, as has been described above, the light refracted by the optical steps 231 is directed upwards towards the right as is shown in FIG. 6A when viewed from the front and is directed upwards towards the rear as is shown in FIG. 6B when viewed from the side. Then, the light guided into the interior of the light guide plate 21 is guided as far as a right upper area while being internally reflected on front, rear, left-hand and right-hand surfaces of the light guide plate 21. The light guided in this way is reflected on the minute light reflecting elements 211 in the course of guiding, whereby part of the light so reflected is reflected towards the front of the light guide plate 21 so as to be outputted to the front of the lamp from the light emission surface 21*o* at the front of the light guide plate 21.

As this occurs, since the light being guided in the interior of the light guide plate 21 is absorbed by the light guide plate 21 or part of the light being so guided leaks out from the front, rear, left-hand and right-hand surfaces of the light guide plate 21 as the light is guided towards the right upper area, the quantity of light that is guided as far as the right upper area would normally be reduced. However, in the first exemplary embodiment, since the light inputted from the light introduction surface 21*i* is directed towards the direction which matches the three-dimensionally curved direction of the light emission surface 21*o* of the light guide plate 21, the angle of incidence of light or at which light is inputted into the light guide plate 21 for internal reflection on the internal surfaces such as the curved front and rear surfaces, as well as both the left-hand and right-hand surfaces can be made larger than a critical angle, thereby making it possible to suppress the leakage of light to the outside of the light guide plate 21.

In addition, since the width dimension of the light guide plate 21 is made to be reduced gradually towards the right upper area, even though the quantity of light is reduced, the quantity of light per unit area of the light guide plate 21 in the right upper area (i.e., the brightness in the right upper area) is maintained at such a level that there is generated no remarkable difference in brightness between the right upper area and the left lower area of the light guide plate 21. Further, the light guide plate 21 may be formed in such a manner that the thickness thereof is reduced as the distance from the light introduction surface 21*i* increases. As this occurs, the quantity of light emitted from the light emission surface 21*o* becomes more difficult to be attenuated even in positions which lie far apart from the LED elements 222, thereby making it possible to obtain a uniform surface illumination. Consequently, light can be outputted with uniform brightness over the whole surface area of the light guide plate, whereby the light guide plate 21 is made to function as an illuminant uniformly bright over the whole surfaces thereof.

Incidentally, in FIGS. 6A, 6B, in the event that light emitted from the individual LED elements 222 is inputted to the light introduction surface 21*i* in the optical axis direction Ox, since the angle of incidence or the angle at which light is so inputted for projection on the curved left-hand inner surface of the light guide plate 21 is large, the quantity of light which is not totally reflected is increased, whereby the quantity of light which is guided as far as the right upper area is decreased remarkably, and therefore, it becomes more difficult to illuminate brightly the right upper area.

Figure 7:
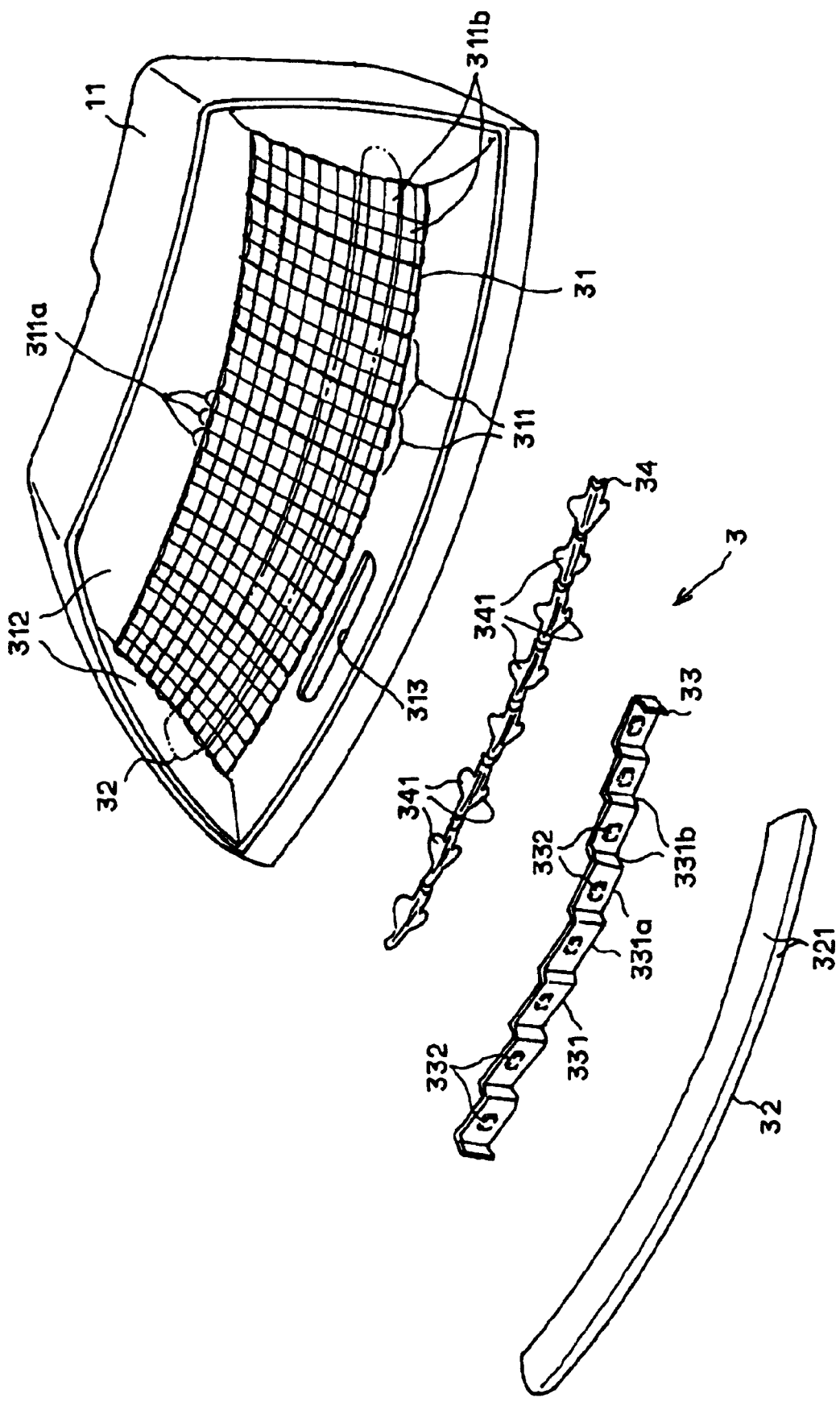
FIG. 7 is a partial exploded enlarged perspective view of a reflector emission unit according to a second embodiment of the present invention.

FIG. 7 is a partial exploded perspective view showing a schematic configuration of the reflector emission unit 3. Referring to FIGS. 2 and 3, as well, the main reflector 31 is formed in such a manner that firstly, a front surface of the lamp body 11 is formed so that a vertical section has a reflecting surface configuration and thereafter, a surface treatment such as plating or depositing of metal such as aluminum is applied to the front surface. This main reflector 31 comprises a plurality of unit reflecting surfaces 311 which are arranged in such a manner that a horizontal section of the main reflector 31 has a staircase-like configuration which matches the horizontally curved configuration of the front cover 12.

Figure 10:
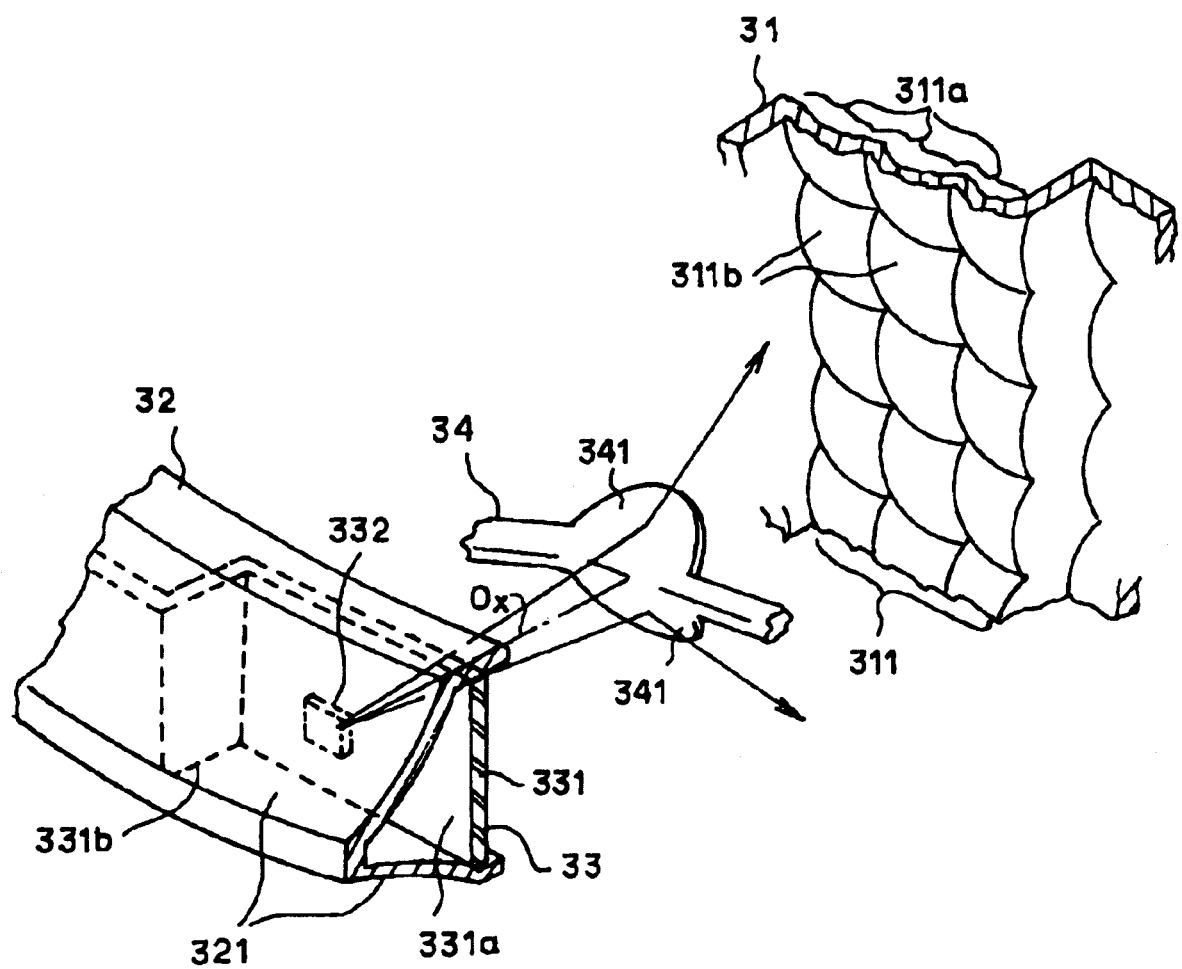
FIG. 10 is a perspective view showing the reflector emission unit according to a sixth exemplary embodiment of the present invention.

Further, referring to FIG. 10, the each unit reflecting surface 311 is divided horizontally into three areas which individually configure minute width reflecting surfaces 311*a*. A front surface (i.e., a reflecting surface) of each minute width reflecting surface 311*a* is made up of reflecting steps 311*b* which each have a substantially projecting spherical configuration and which are arranged in the vertical direction. Since the respective reflecting steps 311*b* of the minute width reflecting surfaces 311*a* which adjoin each other are arranged so as to be aligned in position with each other with respect to the vertical direction, when the main reflector 31 is seen from the front, the individual reflecting steps 311*b* are arranged in a grid-like array. By this, although the individual unit reflecting surfaces 311 are made into reflecting surfaces which reflect light projected thereon into a pencil of light which is substantially parallel with respect to the vertical direction, at the same time, the individual unit reflecting surfaces 311 are made into reflecting surfaces which reflect light projected thereon while being diffused vertically and horizontally by the individual reflecting steps 311*b*. In addition, as to the orientations of the plurality of unit reflecting surfaces 311, although the unit reflecting surfaces 311 which are disposed on a side of the lamp which lies closer to the center of the vehicle on which the lamp is mounted are oriented to the forward direction, the unit reflecting surfaces 311 which are disposed on a side of the lamp which lies closer to the outside of the vehicle (in this exemplary embodiment, a right-hand side of the lamp) are set in such a manner that the unit reflecting surfaces 311 which are disposed further rightwards are oriented further rightwards. In particular, in the case of the front cover 12 being extended to turn toward the side area of the vehicle, the unit reflecting surfaces 311 of the main reflector 31 are formed to be extended to the area to which the front cover 12 turns round.

Returning to FIG. 7, an extension 312 forming a dummy reflector is provided so as to extend integrally around the periphery of the main reflector 31. The lower end portion of the light guide plate 21, the LED element assembly 22 and the stepped plate 23 of the light guide plate emission unit 2 are disposed underneath the extension 312 through a slit 313 provided in a lower area of the extension 312. Since these members are concealed by the extension 312, they are made to be prevented from being exposed to the outside through the front cover 12. In addition, the slit 313 is also prevented from being exposed to the outside by a decorative plate 24 (refer to FIG. 2). Note that the left-hand lamp has an opposite configuration to what has been described heretofore.

The center portion 32 is made to extend long in the horizontal left-right direction along a line which connects together horizontally positions which lie in the vicinity of focal point positions of the respective unit reflecting surfaces 311 of the main reflector 31 (focal points in a parabolic surface which configures a vertical section of each unit reflecting surface). In addition, a section of the center portion 32 which follows a direction along the lamp optical axis Lx is formed into a configuration in which the center portion 32 is opened in a V shape on a back side thereof towards the back of the lamp, and the center portion 32 is fixed to left-hand and right-hand walls of the extension 312 at both end portions thereof in the direction in which the center portion 32 extends. To fix the center portion 32 in this way, a locking construction which is not illustrated in the drawings or a fixing construction which employs screws or the like is employed. The center portion 32 is thus aligned relative to the main reflector 31, that is, the center portion 32 is located in the position which lies substantially close to the focal point positions of the unit reflecting surfaces 311.

A front surface 321 of the center portion 32 has a sectional configuration which is slightly recessed in the vertical direction, and as with the main reflector 31, a surface treatment for reflecting light is applied to the front surface 321. On the other hand, a horizontally elongated circuit board 331 is disposed on a back side in the V-shaped interior of the center portion 32 so as to project in a staircase-like fashion in which a plurality of flat portions 331*a* are connected together via corresponding step portions 331*b* at equal intervals to the intervals at which the respective unit reflecting surfaces 311 of the main reflector 31 are arranged horizontally and, moreover, so as to be spaced an equal distance apart from front surfaces of the individual unit reflecting surfaces 311. The circuit board 331 is integrally supported on the center portion 32. Here, the circuit board 331 is fixedly supported on the center portion 32 in a plurality of locations in the length direction by way of bonding or with screws. A single light emitting LED 332 is mounted on each of the plurality of individual flat portions 331*a* of the circuit board 331 with its light output direction oriented in the direction towards the back side. The LEDs 332 configure an LED assembly 33 (a second light source). These LED elements 332 may be provided either in the form of a chip or as discrete LED elements, and the number of LED elements 332 is larger than that of LEDs 222 of the light guide plate emission unit 2, whereby the LED assembly 33 is configured as a light source which is illuminated with high luminous intensity as a whole. However, alternatively, a plurality of LED elements 222 may be mounted on each of the plurality of flat portions 331*a*.

A sub-reflector 34 is provided so as to extend horizontally along the center portion 32 in a position which lies on a back side of the LED assembly 33 and where light emitted from the individual LED elements 332 is projected, and is supported on the circuit board 331 in a plurality of locations in a length direction thereof with screws or the like. The sub-reflector 34 is bent in a staircase-like fashion so as to ensure an equal space between the individual LED elements 332 and the sub-reflector 34 to thereby be formed to have a stem-like configuration having a horizontal narrow width. Auxiliary reflecting surfaces 341 are formed in positions which are opposed to the individual LED elements 332 in the optical axis direction. The auxiliary reflecting surfaces 341 each have a horizontally collapsed V-shaped section for reflecting light emitted from the LED elements 332, and respective front surfaces thereof are surface treated so as to be made into light reflecting surfaces. These auxiliary reflecting surfaces 341 are made to reflect light emitted from the individual LED elements 332, with respect to the vertical direction, at a relatively large angle so that light so outputted is made to be projected onto the upper and lower areas of the main reflector 31 which resides backwards thereof. That is, the auxiliary reflecting surfaces 341 reflect light towards the individual unit reflecting surfaces 311 of the main reflector 31 excluding areas lying in the vicinity of the lamp optical axis Lx, in other words, so as to be diffused so that the width of the pencil of light is extended.

Since the auxiliary reflecting surfaces 341 are each formed to have a curved surface which is inclined in the directions towards the respective vertical upper and lower back sides and which is made to project slightly, light emitted from the individual LED elements 332 is reflected while being diffused in the vertical directions. As this occurs, since light emitted from the LED elements 332 is originally reflected while being diffused slightly, even though the auxiliary reflecting surfaces 341 are formed into flat planes, light reflected by the auxiliary reflecting surfaces 341 can be made into diffused light. In addition, the sub-reflector 34 may be supported directly on the center portion 32. By adopting this configuration, not only the circuit board 331 and the LED elements 332 which are mounted thereon but also the sub-reflector 34 in this exemplary embodiment are covered to be concealed by the center portion 32 so as not to be exposed to or seen from the outside when the circuit board 331, the LED elements 332, and the sub-reflector 34 are attempted to be viewed from the front of the lamp.

Figure 8A:
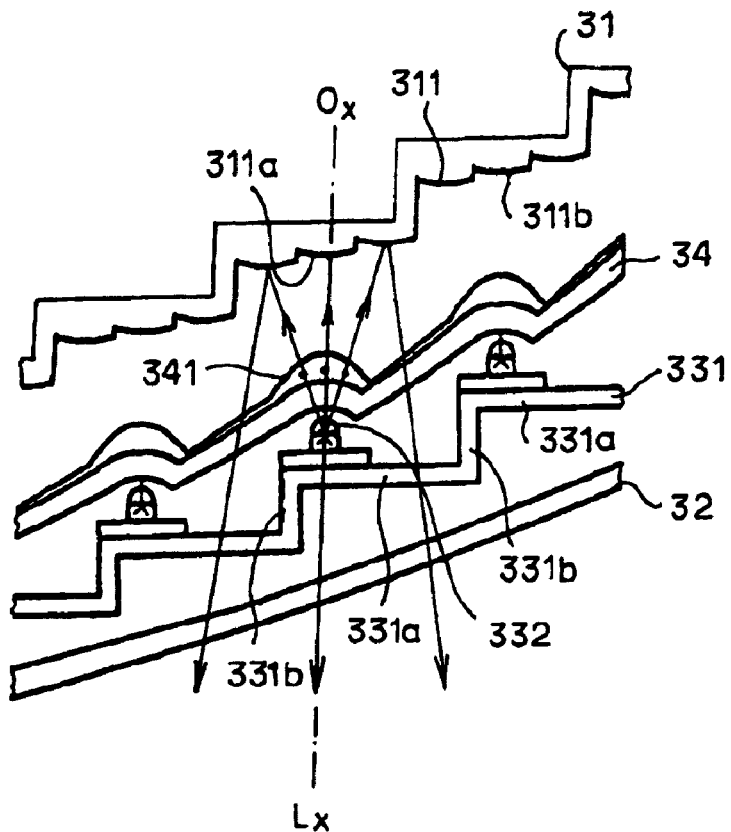
FIGS. 8A and 8B are diagrams illustrating reflected light paths of the reflector emission unit.
Figure 8B:
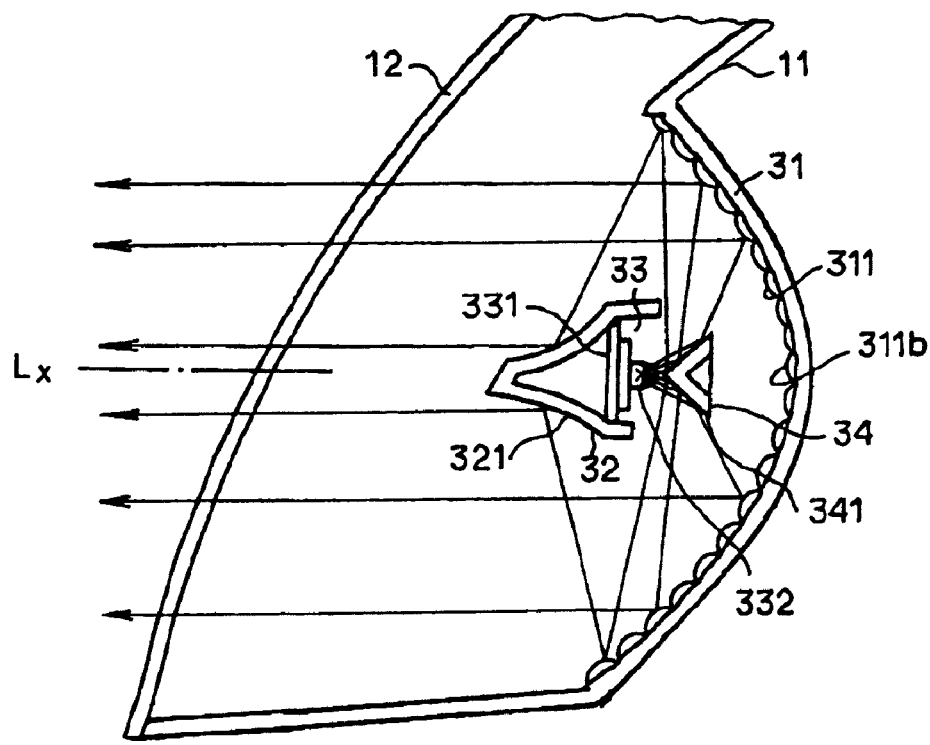

Horizontal and vertical light paths of the reflector emission unit 3 are shown in FIGS. 8A, 8B, respectively. Light emitted towards the back side of the lamp from the individual LED elements 332 is reflected on the individual auxiliary reflecting surfaces 341 of the sub-reflector 34. However, as this occurs, since the front surfaces of the sub-reflector 34 are inclined upwards and downwards, light is reflected so as to spread in the vertical directions at a relatively large angle. On the other hand, as to the horizontal direction, light is reflected in the direction towards where the light was outputted.

Light reflected by the sub-reflector 34 is projected on the main reflector 31, where light is reflected in the forward direction, so as to be outputted to the front of the tail lamp, that is, to the rear of the motor vehicle through the front cover 12. As this occurs, light emitted from the individual LED elements 332 and reflected on the sub-reflector 34 is projected on to the corresponding unit reflecting surfaces 311 of the respective LED elements 332 on the main reflector 31 so as to be reflected on the individual unit reflecting surfaces 311. As this occurs, light reflected on the individual unit reflecting surfaces 311 forms a pencil of light which is nearly parallel and is directed generally towards the front of the lamp because the vertical sections of the minute width reflecting surfaces 311*a* which make up the unit reflecting surfaces 311 each have the parabolic surface configuration. As this occurs, since the minute width reflecting surfaces 311*a* are each formed of the large number of reflecting steps 311*b*, the pencil of light formed is diffused slightly in the horizontal direction and the vertical direction. As this occurs, with respect particularly to the vertical direction, since light emitted form the LED elements 332 is projected onto the areas on the main reflector 31 which exclude the areas lying in the vicinity of the lamp optical axis Lx of the main reflector 31, all the light so projected is reflected on the unit reflecting surfaces 311 so as to be outputted in the direction towards the front of the lamp. Because of this, there is no such situation that light from the LED elements 332 is projected onto the areas of the main reflector 31 which lie in the vicinity of the lamp optical axis Lx, and light reflected there is interrupted by the sub-reflector 34 or the center portion 32, whereby the light is not outputted in the direction towards the front of the lamp, the light utilization efficiency being thereby reduced. When viewed from the front of the lamp, an illuminated state is generated in the lamp in which the area resulting from the combination of the main reflector 31 and the center portion 32 is illuminated.

Since the unit reflecting surfaces 311 each have the parabolic vertical section, most of light reflected by the individual unit reflecting surfaces 311 is made to configure a pencil of nearly parallel light which is directed in the direction towards the front of the lamp. With respect to the horizontal direction, since the unit reflecting surfaces 311 each have the linear horizontal section, light emitted from the LED elements 332 is reflected as it keeps the form of a pencil of light which was the form in which it was outputted from the LED elements 332 and remains in the same form even after the reflection. As this reflection takes place, since the minute width reflecting surfaces 311a are each made up of the large number of reflecting steps 311b which each have the projecting surface configuration, light is diffused while being reflected. As a result, there is produced an illuminating form in which the single unit reflecting surface 311 of the main reflector 31 is illuminated by the single LED element 332, and moreover, an illumination can be realized which is uniform over the whole surface of the main reflector 31 except for shaded portions which are produced in the vicinity of the lamp optical axis Lx of the main reflector.

In addition, in this way, by reflecting light emitted from the LED elements 332 in such a state that the light is divided vertically by the sub-reflector 34 and making the light so reflected be projected onto the main reflector 31, the light can be projected over the wide area on the main reflector 31 even though the space dimension between the LED elements 332 and the main reflector 31 is small. Because of this, the dimension of the reflector emission unit 3 which follows the lamp optical axis Lx can be reduced, which becomes advantageous in realizing a reduction in thickness of the tail lamp. In particular, even in the tail lamp in which the light guide plate emission unit 2 is incorporated, which was described in first exemplary embodiment, the dimension along the lamp optical axis direction can be reduced, thereby making it possible to reduce the thickness of the lamp.

Further, since the circuit board 331 is made to extend horizontally in the left-right direction by the plurality of flat portions 331a on which the LED elements 332 are mounted being connected together via the corresponding step portions 331b, the LED elements 332 can be mounted on the individual flat portions 331a with their optical axis directions oriented towards the lamp optical axis Lx. In addition, by the step portions 331b being designed as require, the plurality of LED elements 332 can be positioned on the three-dimensional plane along the horizontal curved configuration of the main reflector 31, that is, along the focal point positions of the individual unit reflecting surfaces 311. Because of this, in each of the LED elements 332, an illumination is enabled which extends widely over the horizontal length range of the circuit board 331 while maintaining the vertical light distribution characteristics and has the uniform brightness. Thus, the reflector emission unit 3 can be applied particularly to the lamp of which the light emitting surface has a three-dimensional plane which matches the body shape of the motor vehicle.

On the other hand, in each unit reflecting surface 311, there exists an area where light from each LED element 332 is not projected in the area which is opposed to by the sub-reflector 34 which includes an illumination optical axis Ox of the LED element 332. No reflected light from the main reflector 31 exists in this area, and hence, when the tail lamp is seen from the front, that portion configures a shaded portion. However, since this area is an area which does not originally contribute to the illumination of the lamp, this becomes advantageous in enhancing the utilization efficiency of light.

Further, part of light which is reflected at both the vertical end portions, that is, the upper area and the lower area of each unit reflecting surface 311, is reflected largely downwards or upwards by virtue of the diffused reflection at the reflecting steps 311b, and the light so reflected is then projected onto the front surface 321 of the center portion 32. Since the front surface 321 of the center portion is formed into a reflecting surface having a recessed or concave surface configuration, the light is reflected on the front surface 321 so as to be directed towards the front of the lamp. Consequently, when the lamp is seen from the front, the reflected light reflected on the individual unit reflecting surfaces 311 and the reflected light reflected on the front surface 321 of the center portion 32 are made integral with each other so as to be outputted to the front of the lamp through the front cover 12. When seen from the front of the lamp, there is produced an illuminated state that is generated in the lamp in which the area resulting from the combination of the main reflector 31 and the center portion 32 is illuminated. By this, the dark area which resides in the vicinity of the optical axis of the main reflector 31 and where the reflected light reflected at the sub-reflector 34 is not projected is illuminated by the reflected light reflected at the center portion 32, whereby the risk of producing a dark portion is eliminated. Consequently, an illumination with uniform brightness can be realized which extends over the large light emitting area by utilizing the whole surface of the main reflector 31 as the light emitting surface, which is uniform in brightness over the whole surface of the main reflector 31, and which is free from a dark area due to the reflection from the center portion 32 being able to be used to eliminate the dark area which would otherwise be produced.

In the lamp of the first exemplary embodiment which includes the light guide plate emission unit 2 and the reflector emission unit 3, when the vehicle is driven during night time, the LED elements 222 which function as the first light source are illuminated. Light emitted from the LED elements 222 is refracted on the optical steps 231 on the stepped plate 23 and is inputted into the light guide plate 21 from the light introduction surface 21i which is the lower end face of the light guide plate 21 and is thereafter guided in the interior thereof. In addition, the light so guided is outputted from the light emission surface 21o of the light guide plate 21 at the minute reflecting elements 211. As this occurs, since light refracted by the optical steps 231 and guided in the interior of the light guide plate 21 is directed in the direction which matches the three-dimensionally curved configuration of the light emission surface 21o of the light guide plate 21 as has been described before, the internal reflection within the light guide plate 21 is promoted so as to reduce the leakage of light from both the lateral surfaces and the back surface of the light guide plate 21. This enhances the light guiding efficiency within the light guide plate 21, and the light output efficiency from the light emission surface 21o at the bent right upper area of the light guide plate is also enhanced.

In addition, since the light emission surface 21o of the light guide plate 21 is given the configuration in which the width dimension is gradually reduced towards the right upper area, the surface area of the right upper area becomes smaller than that of the left lower area, whereby even though light attenuation is generated in guiding light in the interior of the light guide plate 21, the light output efficiency per unit area can be made almost the same, and hence, light is outputted with almost the same brightness over the whole surfaces of the light guide plate 21. In addition, light that is not reflected by the minute reflecting elements 211 in the light guide plate 21 and light that is not reflected on the inner surfaces of the light guide plate 21 are outputted from not only the front and back surface but also the left-hand and right-hand lateral surfaces so as to configure light that is diffused horizontally and vertically from the light guide plate 21 within the lamp, whereby when the lamp is seen from the left-hand or right-hand side or top or bottom side thereof, the light guide plate 21 is seen as being illuminated. This produces a form in which the light guide plate 21 is illuminated over the whole surfaces with almost uniform brightness, whereby the lamp is lit in the illumination form which is superior with respect to design.

On the other hand, when the brakes of the vehicle are applied, the LED elements 332 which function as the second light source are illuminated. Light emitted from the individual LED elements 332 is diffused vertically at a large angle on the auxiliary reflecting surfaces 341 of the sub-reflector 34 and is reflected horizontally in the direction towards where the light was originally outputted. By this reflection, light from the individual LED elements 332 is projected on to the minute width reflecting surfaces 331 and is then reflected individually. Most of the light is reflected in the direction towards the front of the lamp and is then outputted in the direction towards the front of the lamp through the front cover 12. As this occurs, in the area where the light guide plate 21 is superimposed when the lamp is seen from the front, light from the reflector 31 passes through the light guide plate 21 in the thickness direction and is thereafter outputted from the front cover 12. In addition, light reflected on the upper area and the lower area of the main reflector 31 is directed towards the center portion and is then reflected on the front surface 321 of the center portion 32. Then, the light so reflected is directed towards the front of the lamp and is then outputted through the front cover 12. By this, since light emitted from the main reflector 31 and light emitted from the center portion 32 are combined together so as to be outputted from the front cover 12, when the lamp is seen from the front, a state is produced in which these areas are illuminated brightly as a whole, whereby the reflector emission unit 3 is lit as the stop lamp which is illuminated with higher luminous intensity than the light guide plate emission unit 2.

Moreover, in the lamp of first exemplary embodiment, when the lamp is lit to function as the tail lamp, the lamp is lit in such a state that the light guide plate 21 is illuminated over the whole surfaces thereof, while when the lamp is lit to function as the stop lamp, the lamp is lit in such a state that the main reflector 31 and the center portion 32 are illuminated. By this configuration, the illumination patterns of the lamp when lit are changed between the tail lamp and stop lamp functions, and a following vehicle is allowed to easily identify the illuminations for the tail lamp function and the stop lamp function through the different illumination patterns. In addition to this, since the illumination is implemented by the light guide plate 21 when the lamp is lit to function as the tail lamp, the lamp is lit in such a way as to output soft light, and therefore, there is no such situation that the following vehicle is dazzled. Since the illumination is implemented by the main reflector 31 which employs as the light source the large number of LED elements 322 when the lamp is lit to function as the stop lamp, the lamp is lit in such a way as to output light with high luminous intensity, and hence, an ensured indication that the brakes are being applied can be given to the following vehicle.

Additionally, in the first exemplary embodiment, the sectional shape of the center portion 32 is made in a V-shape opening in the lateral direction and the front surface 321 is made as a recessed surface. Thus, the light reflected on the front surface 321 is projected along with the lamp optical axis Lx. However, when reflecting the light on the front surface 321, an uneven pattern (i.e., a linear brilliant or a dark pattern) may be generated at an apex of the front surface 321. In this case, if the sectional shape of the center portion 32 is made as a curved shape such as semi-circular shape or semi-ellipse shape, the diffusion direction of the reflecting light at the front side of the center portion 32 becomes substantially uniform in a wide range, and thus, such the uneven pattern is not generated.

Further, the center portion 32 is not necessarily disposed in a central position relative to the vertical direction of the main reflector 31. Even if the center portion 32 is disposed at a position shifted from the center, if the lamp has a configuration that the light emitted from the LED element 332 is reflected on the sub-reflector 34 to be projected toward the main reflector 31 and the light is reflected and projected toward the front side of the lamp by the main reflector 31, the present invention can be applied thereto.

In addition, although illustration is omitted, the configuration of the reflection steps 311b of the minute width reflecting surfaces 311a of the main reflector is not limited to the projecting spherical surface which is realized in the first exemplary embodiment, and hence, a semi-cylindrical reflection step may be adopted whose vertical section has a convex or projecting configuration.

[Second Exemplary Embodiment]

While in the first exemplary embodiment, the light emission surface of the light guide plate is illustrated as having a configuration in which the light emission surface is curved curvilinearly from the bottom left area to the top right and rearward area when the tail lamp is seen from the front, the invention can be applied equally in the event that the configuration of the optical steps is changed to match a different front surface configuration of the light guide plate.

For example, a light guide plate 21A according to a second exemplary embodiment shown in FIG. 9A has a configuration in which the light guide plate 21A is nearly symmetrical in a horizontal direction and is curved in a three-dimensional direction in such a manner that the width dimension of the light guide plate 21 is gradually reduced from a lower portion towards an upper portion. In the case of the light guide plate 21A, an optical step at a central portion of a stepped plate 23A has a configuration in which no light is refracted in such a way that light from an LED element is directed vertically upwards, whereas optical steps lying left wards and rightwards thereof are given configurations in which light from corresponding LED elements 222 are refracted in such a way as to be gradually inclined towards the center of the light guide plate 21A.

[Third Exemplary Embodiment]

Alternately, in a third exemplary embodiment shown in FIG. 9B, a light guide plate 21B is formed as having a configuration in which the light guide plate 21B is curved in a three-dimensional direction in such a way as to extend obliquely with a substantially equal width dimension. In the case of the light guide plate 21B, individual optical steps on a stepped plate 23B may be formed to have the same configuration so that light is refracted in the same direction. In the case of the third exemplary embodiment, since the optical steps do not have to be formed to have the serrated configuration, the stepped plate 32B is configured as a simple tapered plate.

[Fourth Exemplary Embodiment]

While in the first, second, and third exemplary embodiments, the optical steps are made into the stepped plate and are configured as a separate member from the light guide plate, as is illustrated by the fourth exemplary embodiment shown in FIG. 9(c), it also possible to form optical steps 231 integrally on a light introduction surface of a light guide plate 21. By adopting this configuration, the necessity of a stepped plate is obviated, which is advantageous in reducing the number of constituent components. Alternately, a stepped plate which is formed separately from a light guide plate 21 as in the first, second, and third exemplary embodiments may be joined or bonded integrally to a light introduction surface of the light guide plate, which is advantageous in simplifying the configuration.

The light guide plate of the light guide plate emission unit of the invention is not limited to those having the configurations illustrated in the first, second, third, and fourth exemplary embodiments. The invention may be applied equally to a light emitting unit including a light guide plate whose side edges are shaped in such a way as to be bent curvilinearly or rectilinearly therealong or which is bent curvilinearly in its thickness direction and in which light from the light source unit is inputted into the interior of the light guide plate from one end face thereof so as to be guided therethrough. Further, although illustration is omitted, in the case of the light guide plate being curved three-dimensionally, also in a case where a configuration is adopted in which a light guide plate is curved so as to be twisted in its thickness direction to match the three-dimensional curvature of a front cover, a configuration may only have to be adopted for optical steps which correspond to individual LED elements in which the light refracting direction at the optical steps matches the curvilinear configuration of the light guide plate.

According to one or more illustrative aspects of the invention, there is provided a lamp including:
 a light guide plate emission unit including:
  a first light source;
  a light guide plate including:
   a light introduction surface provided so as to oppose to the first light source; and
   a curved light emission surface through which the light introduced from the light introduction surface and passing through the light guide plate is emitted; and
  an optical step which is provided on the light introduction surface and which refracts the introduced light to a direction in which the light emission surface is curved.

According to the illustrative aspects, since light emitted from the LEDs is diffused and reflected by the sub-reflector and is then reflected by the main reflector so as to be diffused towards the front of the lamp, the substantial reflecting surface of the main reflector can be increased, thereby making it possible to provide the lamp having the wide light emitting area. In addition, since the base plate on which the LEDs are mounted extends by connecting the plurality of flat portions together with the step portions, the light emitting area can be extended in the direction in which the base plate extends, and the light emitting surface can be formed into the three-dimensional plane, whereby the present invention can be applied to a lamp in which a light emitting surface is curved. Further, a design portion (center portion) covers the base plate and the LEDs so as not to be exposed from the front of the lamp, and also since the design portion covers the areas which do not constitute the reflecting surface of the main reflector, the aesthetic external appearance of the lamp is improved.

Moreover, the sub-reflector may be adapted to reflect light emitted from the LEDs in a direction vertical to the extending direction of the design portion while diffusing the light widely, and the main reflector may include a plurality of unit reflecting surfaces which are disposed stepwisely so as to follow a curved configuration of a front cover of the lamp housing. In this case, a light distribution area in a direction perpendicular to the extending direction of the design portion (which is the same as the extending direction of the base plate or the arrangement direction of the LEDs) is enlarged. Further, even if the lamp extends to reach a side portion of the lamp (such as the front cover greatly curving in the horizontal direction), the reflecting surface of the main reflector can be provided on the thus curved area and the lamp can emit the light uniformly including the thus curved area.

Further, the design portion may include a reflecting surface at a front side thereof, and the main reflector may include reflecting steps for reflecting part of the reflected light towards the reflecting surface of the design portion. Since part of the light reflected by the main reflector is reflected on the front surface of the design portion, a lamp can be obtained in which both the main reflector and the design portion function as the light emitting surface, and hence, no dark portion is generated and the light can be emitted over a wide area.

Furthermore, according to illustrative aspects of the invention, the base plate may be adapted to be supported on the design portion, the sub-reflector may be supported on either the base plate or the design portion, the design portion may include a fixed portion at an end of the extending direction and the fixed portion of the design portion may be supported on a fixing portion of the lamp so as to be positioned relative the main reflector.

The fixing portion of the lamp is not limited to the main reflector, as long as the design portion is fixedly supported relative to the main reflector, the fixing portion may be the lamp body or the dummy reflector (such as an extension) which is formed integrally with the main reflector.

Since the base plate and the sub-reflector are supported directly or indirectly on the design portion and the design portion is supported in such a state that the design portion is positioned relative to the main reflector, the LEDs mounted on the base plate and the sub-reflector are positioned relative to the main reflector, whereby the lamp can be obtained which has the light distribution pattern as designed.

According to one or more additional illustrative aspects of the invention, there is provided a lamp including:
 a lamp housing;
 a plurality of LEDs provided within the lamp housing;
 a main reflector disposed so as to oppose to the LEDs for reflecting light emitted from the individual LEDs towards a front side of the lamp;
 a sub-reflector interposed between the LEDs and the main reflector for reflecting light emitted from the LEDs towards the main reflector while diffusing the light;
 a base plate extending along with the LEDs and having a plurality of flat portions;
 a design portion which covering the base plate and the LEDs so as not to be exposed to the front side of the lamp,
 wherein the flat portions are connected to each other via at least one step portion,
 wherein at least one of the LEDs are mounted on the flat portion, and
 wherein the design portion extends in a direction in which the base plate extends.

Here, the curved shape of the light emitting surface denotes a shape in which the light emitting surface is not a flat shape but a curved shape with respect to at least one of horizontal and vertical directions.

According to the additional illustrative aspects of the invention, when the light emitted from the first light source is introduced from the light introduction surface, the light is refracted by the optical step toward the curved direction of the light emission surface. Since thus refracted light is guided through the light guide plate, the leakage of the light from the light guide plate can be suppressed and the light can be efficiently guided to an area located far from the light introduction surface. Thus, a uniform light emission over the whole surface area of the light emission surface is enabled. Accordingly, the light emission surface with uniform brightness is obtained and the lamp having improved illumination effect and external appearance is obtained.

Additionally, the width dimension of the light emission surface of the light guide plate may be gradually decreases with distance from the light introduction surface. Accordingly, even in the event that the intensity of light is attenuated as it is guided in the interior of the light guide plate, the brightness of the light emission surface per unit area can be made equal.

Further, the first light source may be a plurality of LED elements which are arranged along the light introduction surface, the optical step may be a plurality of light refraction members, and a number of the light refraction members may be the same as a number of the LED elements. Here, the optical step may be identical or different shape each other. Further, the optical step may be separated from or integrated with the light guide plate. In this case, even if the first light source has the plurality of LED elements, light from the respective LED elements can be guided towards the curved direction of the light emission surface, whereby the light guiding efficiency or light emission efficiency can be enhanced so as to obtain a bright light emitting surface.

Furthermore, the lamp may further include a lamp housing including: a lamp body; and a curved front cover attached to a front side of the lamp body, the first light emission unit being mounted within the lamp housing, and the light emission surface of the light guide plate being curved so as to follow the front cover. Even if the light emission surface of the light guide plate is designed so as to be curved along the front cover of the lamp, the light emission surface of the light guide plate can be illuminated with uniform brightness, whereby the illumination effect and external appearance of the lamp are improved.

Further, the lamp may further include a second light emission unit mounted within the lamp housing, the second light emission unit including: a second light source; and a reflector which is arranged so as to extend along a certain area so as to oppose to the front cover and is adapted to reflect light emitted from the second light source toward a front side of the lamp, wherein the light guide plate is arranged so as to partially overlap the reflector in a position on a front side of the reflector when viewed from the front of the lamp.

By selectively lighting the reflector emission unit and the light guide plate emission unit, the one lamp can be lit in different light emitting forms, whereby the one lamp can be used for lamps having different functions, and the design of the lamp can be enhanced.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A lamp comprising:
a lamp housing;
a plurality of light emitting diodes (LEDs) provided within the lamp housing;
a discrete main reflector disposed so as to oppose to the LEDs for reflecting light emitted from the LEDs towards a front side of the lamp;
a discrete sub-reflector which is interposed between the LEDs and the main reflector, and which reflects and diffuses the light emitted from the LEDs towards the main reflector;
an LED element assembly which extends in parallel with the sub-reflector and comprises a plurality of flat portions, each flat portion corresponding to one of the plurality of LEDs and on which the corresponding LED is mounted, adjacent ones of the flat portions being coupled together by at least one step portion; and
a center portion which covers the LED element assembly and the LEDs such that the LEDs are not exposed to the front side of the lamp;
the sub-reflector being located on the illumination optical axes of the LEDs;
the sub-reflector being spaced apart from the main reflector.

2. The lamp as set forth in claim 1,
wherein the sub-reflector reflects and diffuses the light emitted from the LEDs in a direction vertical to the extending direction of the center portion,
wherein the lamp housing comprises a front cover, and
wherein the main reflector comprises a plurality of unit reflecting surfaces which are disposed stepwisely so as to follow a contour of a front cover of the lamp housing.

3. The lamp as set forth in claim 1,
wherein the center portion comprises a reflecting surface on a front side thereof, and
wherein the main reflector comprises a plurality of reflecting steps which are arranged in an array and reflect part of the light towards the front of the lamp.

4. The lamp as set forth in claim 1,
wherein the LED element assembly is supported on the center portion,
wherein the sub-reflector is supported on either the LED element assembly or the center portion,
wherein the center portion comprises a fixed portion at an end of the center portion in the extending direction, and
wherein the fixed portion is supported on a fixing portion of the lamp so as to be positioned relative to the main reflector.

5. The lamp as set forth in claim 1, the sub-reflector comprising a plurality of auxiliary reflecting surfaces each having a horizontally collapsed V-shaped section.

6. A lamp comprising:
a first light emission unit comprising:
a first light source;
a light guide plate comprising:
a light introduction surface provided so as to oppose to the first light source; and
a curved light emission surface which emits light from the first light source that has passed through the light introduction surface; and
an optical step which is provided on the light introduction surface and which refracts the light from the first light source in a direction in which the light emission surface is curved;
wherein the first light source comprises a plurality of light emitting diode (LED) elements which are arranged parallel to the light introduction surface,
wherein the optical step comprises a plurality of light refraction members provided together in a stepped shape, the stepped shape comprising a plurality of wedge-shaped steps.

7. The lamp as set forth in claim 6,
wherein width dimension of the curved light emission surface of the light guide plate gradually decreases with distance from the light introduction surface.

8. The lamp as set forth in claim 6,
wherein a number of the light refraction members is the same as a number of the LED elements.

9. The lamp as set forth in claim 6, further comprising:
a lamp housing comprising:
a lamp body; and
a curved front cover attached to a front side of the lamp body,
wherein the light guide plate is mounted within the lamp housing, and
wherein the curved light emission surface of the light guide plate is curved so as to follow the front cover.

10. The lamp as set forth in claim 9, further comprising:
a second light emission unit which is mounted within the lamp housing, and comprises:
a second light source; and
a reflector which is arranged so as to oppose to the front cover and is adapted to reflect light emitted from the second light source toward a front side of the lamp, and
wherein the light guide plate is arranged so as to partially overlap the reflector in a position on a front side of the reflector when viewed from the front of the lamp.

11. The lamp as set forth in claim 9, further comprising:
a second light emission unit which is mounted within the lamp housing, the second light emission unit comprising:
a plurality of light emitting diodes (LEDs) provided within the lamp housing;
a main reflector disposed so as to oppose to the LEDs for reflecting light emitted from the LEDs towards a front side of the lamp;
a sub-reflector which is interposed between the LEDs and the main reflector, and which reflects and diffuses the light emitted from the LEDs towards the main reflector;
an LED element assembly which extends in parallel with the sub-reflector and comprises a plurality of flat portions, each flat portion corresponding to one of the plurality of LEDs and on which the corresponding LED is mounted, adjacent ones of the flat portions being coupled together by at least one step portion;
a center portion which covers the LED element assembly and the LEDs such that the LEDs are not exposed to the front side of the lamp,
wherein the first light emission unit is positioned between the second light emission unit and a front cover of the lamp housing.

12. The lamp as set forth in claim 6, the plurality of light refraction members provided together in the stepped shape comprising the wedge-shaped steps are at different angles relative to optical axes of the respective LEDs elements.

13. A lamp comprising:
a lamp housing;
a reflector emission unit comprising:
an light emitting diode (LED) assembly comprising a plurality of reflective surfaces and a plurality of first LEDs, each of the reflective surfaces having one of the first LEDS mounted thereon, and adjacent ones of the reflective surfaces connected together by a reflective step portion;
a main reflector comprising a plurality of unit reflecting surfaces which are arranged in a grid-like array and reflect light from the first LEDs toward a front of the lamp housing, and an extension that extends around a periphery of the plurality of unit reflecting surfaces and comprises a slit therein;
a sub-reflector which is provided between the LED assembly and the main reflector, and which comprises a plurality of auxiliary reflecting surfaces which reflect and diffuse light emitted from the first LEDs toward the main reflector; and
a center portion which is provided between the LED assembly and the front of the lamp housing so as to cover the LED assembly; and
a light guide plate emission unit comprising:
a plurality of second LEDs;
a light guide plate comprising:
a light introduction surface provided so as to face the plurality of second LEDs; and
a curved light emission surface, the curved light emission surface which emits light, from the second LEDs that has passed through the light introduction surface, toward the front of the lamp housing; and
a stepped plate comprising a plurality of optical steps which is provided on the light introduction surface and which refract the light from the second LEDs in a direction in which the curved light emission surface is curved,
wherein a portion of the curved light emission surface extends through the slit in the extension of the main reflector,
wherein the optical steps comprise a plurality of light refraction members provided together in a stepped shape, the stepped shape comprising a plurality of wedge-shaped steps.

\* \* \* \* \*